J. H. AKIN.
CROCHET HOOK.
APPLICATION FILED JAN. 28, 1919.
1,355,878.
Patented Oct. 19, 1920.
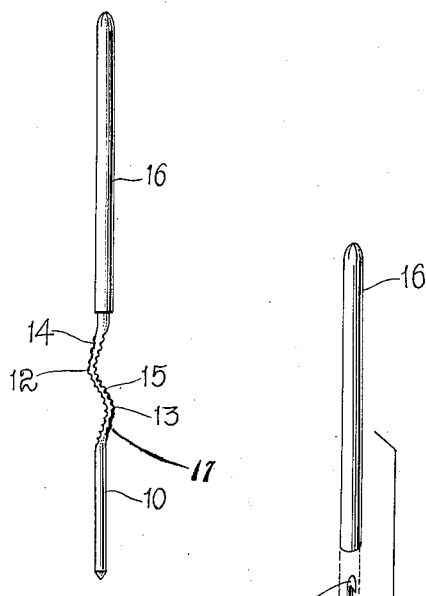
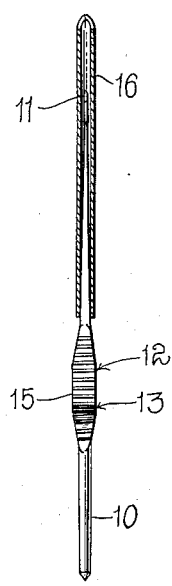
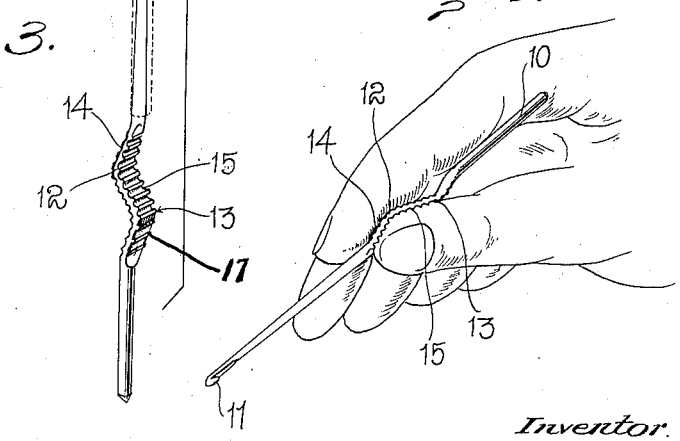
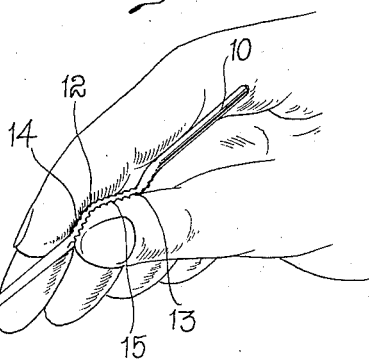
Inventor.
John H. Akin.
Attorneys.

UNITED STATES PATENT OFFICE.

JOHN H. AKIN, OF GILBERT, IOWA.

CROCHET-HOOK.

1,355,878.  Specification of Letters Patent.  Patented Oct. 19, 1920.

Application filed January 28, 1919. Serial No. 273,556.

*To all whom it may concern:*

Be it known that I, JOHN H. AKIN, citizen of the United States, residing at Gilbert, in the county of Story and State of Iowa, have invented certain new and useful Improvements in Crochet-Hooks, of which the following is a specification.

This invention relates to an improved crochet hook and has as its primary object to provide a device of this character so constructed that the hook may be readily grasped by the fingers and firmly held in the hand without sensible exertion.

The invention has as a further object to provide a hook so constructed that even though the hook is not sensibly gripped by the fingers, slipping of the hook will, nevertheless, be prevented.

And the invention has as a still further object to provide a crochet hook having thumb and finger engaging portions so disposed that when the hook is held in the hand and the forefinger and thumb are engaged with said portions, the hook will be properly positioned, thus making it possible for a beginner to at once properly hold the hook and wherein, in thus providing for the proper positioning of the hook within the hand, a perfect tension upon the thread will always be had.

Other and incidental objects will appear hereinafter. In the drawings:

Figure 1 is an edge elevation of the hook showing the protecting cap for the hook in position thereon, Fig. 2 is a front elevation of the device, the cap being shown in section.

Fig. 3 is a detail perspective view of the hook, the protecting cap being removed, and Fig. 4 is a fragmentary perspective view showing the manner in which the hook is grasped.

Referring now more particularly to the drawings, my improved hook is formed with a shank 10. This shank is tapered for the greater portion of its length toward its outer end and is provided with a hook 11. At the inner end of the tapered portion of the shank said shank is flattened for a portion of its length and is formed with reverse bends 12 and 13 respectively. An angular finger engaging portion 14 is thus defined to extend rearwardly with respect to the hook 11 while a similar angular thumb engaging portion 15 is defined to extend forwardly with respect to said hook, it being observed in this connection that the flattened portion of the hook shank is disposed at substantially right angles to the hook 11. Formed on said flattened portion, at opposite sides thereof, are suitable gripping ribs. In order to protect the hook 11 when the device is not in use, a split protecting cap 16 is provided, this cap being adapted, as particularly shown in Figs. 1 and 2 of the drawings, to removably fit over the tapered outer end portion of the hook to frictionally engage therewith.

In use, the hook is held between the thumb and forefinger of the hand, in the manner suggested in Fig. 4, the thumb fitting within the bend 12 of the flattened portion of the hook shank and the forefinger extending at the rear side of the hook and extending over the finger engaging portion 14. When so held the hook will be properly positioned within the hand and may be grasped in the manner indicated without cramping the hand or without cramping the thumb and forefinger. As will be seen, the angular portions 14 and 15 provide shoulders engaged by the thumb while the portion 14 also provides a shoulder engaged by the forefinger so that an effective purchase upon the hook shank will be easily had such as will prevent either the longitudinal or rotative movement of the hook. Furthermore, owing to the presence of the angular portions 14 and 15 upon the hook shank the hook may be easily held to always occupy the same position within the hand and may thus always be properly grasped so that a uniform tension upon the thread will result.

Summarized, it might be stated that this invention embodies a crochet hook having its intermediate portion bent to form a V-shaped gripping portion adapted to provide an efficient means whereby the hook may be grasped by the fingers when it is desired to use the same. It will be noted that the V-shaped gripping portion in the intermediate portion of the shank has one of its arms intersecting the longitudinal axis of the shank to form a thumb engaging portion. The arm of the V-shaped gripping portion which intersects the longitudinal axis of the shank is longer than the other arm of the V-shaped member and is joined or connected to the shank by an offset portion 17 which, as illustrated in Fig. 1, extends in spaced parallel relation to the short arm of the V-shaped member. The V-shaped gripping portion thus formed in the intermediate portion of the shank forms a V-shaped socket for receiving one of the fingers whereby the shank is prevented from slipping longitudinally between the fingers when the hook is in use. With reference to Fig. 3, it will be noted that the V-shaped finger receiving socket thus formed extends out through the same side of the shank as does the hook 11.

Having thus described the invention, what is claimed as new is:

1. A crochet hook having a shank provided intermediate its ends with a V-shaped gripping portion extending out from one side and forming a finger receiving socket in line with the longitudinal axis of the shank.

2. A crochet hook having a shank provided intermediate its ends with a V-shaped gripping portion extending out fron one side and having diverging arms extending angularly with relation to the longitudinal axis of said shank and in the direction of opposite sides of the shanks, said V-shaped gripping portion forming a socket in line with the longitudinal axis of the shank.

3. A crochet hook including a shank provided intermediate its ends with a V-shaped gripping portion having a pair of diverging arms one of which intersects the longitudinal axis of the shank.

4. A crochet hook including a shank inclusive of a hook and a V-shaped laterally projecting gripping portion, said hook and said gripping portion being disposed on diametrically opposite sides of the shank, said V-shaped gripping portion forming a socket in line with the longitudinal axis of the shank, the socket thus formed being extended out from the same side of the shank as does the hook.

5. A crochet hook including a shank having its intermediate portion formed to provide a V-shaped gripping portion extending out from one side and having long and short diverging arms, said shank being provided with an angularly disposed portion extending out from the other side and joined with the long arm of said V-shaped gripping portion said V-shaped gripping portion forming a socket in line with the longitudinal axis of the shank.

6. A crochet hook including a shank provided intermediate its ends with a flattened V-shaped gripping portion having diverging arms one of which intersects the longitudinal axis of the shank, said shank being provided adjacent said V-shaped gripping portion with an angularly disposed portion joined with the forward end of the arm of said V-shaped gripping portion which intersects the longitudinal center of the shank, said offset portion being arranged in spaced parallel relation to one of the arms of said gripping portion.

7. A crochet hook including a shank having its intermediate portion flattened and provided with a V-shaped gripping portion and an offset portion joined with one of the arms of the V-shaped gripping portion, the arms of said gripping portion and said offset portion being provided on opposite sides with ribs so that the fingers may be securely engaged therewith, said V-shaped gripping portion forming a finger receiving socket in line with the longitudinal axis of the shank.

In testimony whereof I affix my signature.

JOHN H. AKIN. [L. S.]